Feb. 22, 1927.
H. H. WALTERS
1,618,560
EDUCATIONAL DEVICE
Filed April 28, 1925
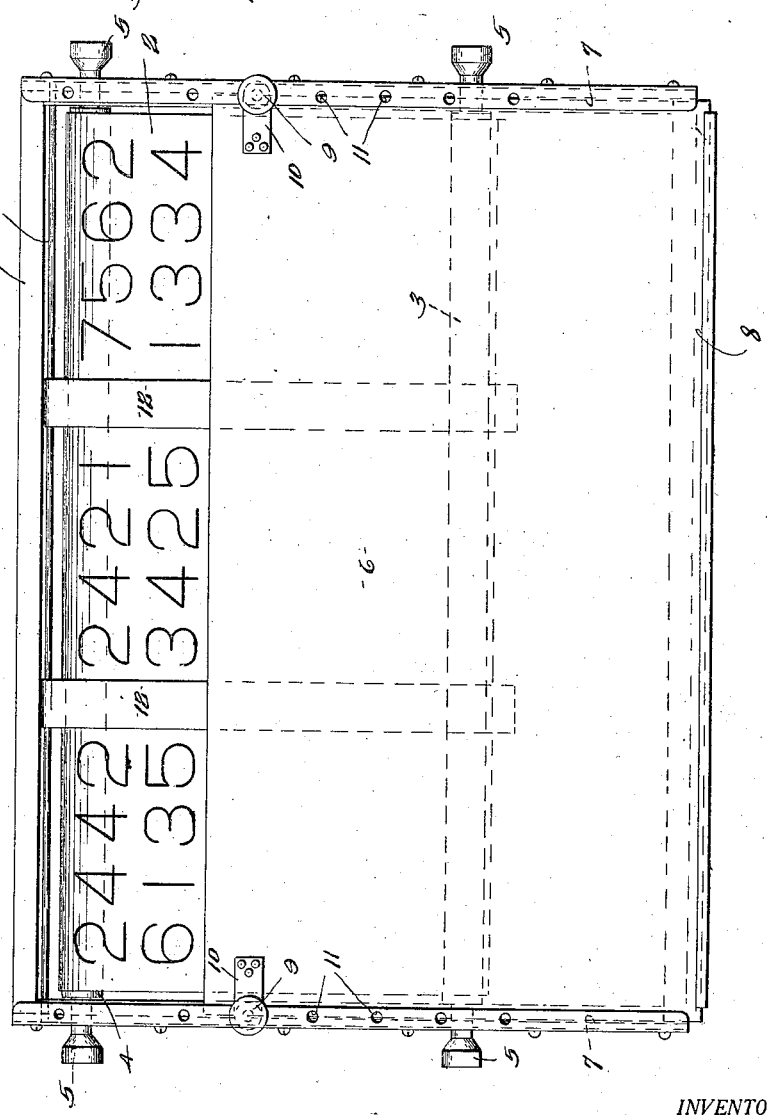
INVENTOR.
Herbert H. Walters.
BY
Parsons & Bodell
ATTORNEY.

Patented Feb. 22, 1927.

1,618,560

UNITED STATES PATENT OFFICE.

HERBERT H. WALTERS, OF SYRACUSE, NEW YORK.

EDUCATIONAL DEVICE.

Application filed April 28, 1925. Serial No. 26,352.

This invention relates to educational devices and particularly devices called for convenience a black board used in primary departments of schools and has for its object an educational device or black board which the teacher can so adjust as to set different problems for the pupil.

The invention consists in the novel features and in the combinations and constructions hereinafter set forth and claimed.

In describing this invention, reference is had to the accompanying drawing in which like characters designate corresponding parts in all the views.

Figure 1 is a front elevation of this device.

Figure 2 is a vertical sectional view thereof.

This device comprises generally a casing or frame, a movable or adjustable chart mounted in the frame and provided with characters arranged in rows and in columns and a black board adjustable in the frame to expose any number of rows. It further includes means for dividing the rows into columns.

1 designates the casing or frame which may be of any suitable form, size and construction, it being here shown as in the form of a shallow box open at its front side.

2 designates the chart which is here shown as winding on spaced apart rollers 3, 4, these rollers being arranged in horizontal position, one near the upper end of the case and the other in the lower part of the case. The portion of the chart between the rollers is exposed at the open side of the box. The chart here shown is provided with horizontal rows of numerals, the numerals in each row being arranged below or in single column with the numbers of the other rows.

The rollers are provided with knobs or handles 5 at their ends by which they may be turned to shift the chart 2.

6 is a black board or closure of the open side of the box, this being arranged to move in channels or guides 7 at the front or open side of the box. The black board is shown as provided with a shallow chalk tray 8 along its lower edge.

The black board 6 is provided with handles 9 at its opposite margins which move along the outer flanges of the channels 7 and these handles are carried by spring straps 10 which tend to press the handles toward the outer face of the flanges, and the handles are provided with pins at the free ends of the straps for entering spaced apart holes 11 in the flanges of the channels and holding the black board at different elevations so as to expose various numbers of rows. As shown the chart is provided with rows of numerals and the black board is adjusted to expose but two of such rows.

Also the rows may be divided into columns or sections by means here shown as spacers 12 adjustable laterally relatively to the frame along a guide rod 13 extending parallel to the rollers and above the upper roller 3. The lower portions of the spacers extend behind the black board. Two spacers are shown. By these spacers the rows of numerals may be subdivided into columns each subdivision containing one, two or three or more numerals. As here shown the rows in each section or column contain four numerals or in the drawing three examples of addition are set up for the pupil to write the answer on the black board under the examples. The last example to the right may be taken as one in subtraction. The chart and spacers may be shifted so that examples in subtraction may be set, that is so that the upper number in one or more of the examples is greater than the lower, that is to provide a minuend and a subtrahend. Each of the rows may not necessarily contain the same number of numerals for example, in the drawing taking the lower row, the numerals 6, 1, 3 may be omitted or other numerals in a row may be omitted to facilitate for instance the setting up of an example in simple multiplication.

In operation, the teacher can adjust the chart to bring the desired row of numerals to the face thereof and also adjust the black board vertically to expose the desired number of rows. Also the spacers 12 can be adjusted to provide numbers of different value to be added, subtracted or multiplied.

This device is particularly advantageous in that it is not only simple in construction, but the teacher can readily set up any example necessary or desirable to teach primary classes.

Although I have shown the chart as provided with numbers, obviously, it may be provided with combinations of letters etc.

What I claim is:

1. An educational device comprising a frame, a chart having characters thereon arranged in rows and columns, the chart being shiftable to bring different rows into reading position, a black board mounted to cover the face of the chart and shiftable to expose any number of rows, and laterally shiftable means for dividing the rows into columns and means for holding the black board in its adjusted position.

2. An educational device comprising a frame, spaced apart rollers mounted in the frame, a chart winding on the rollers with the portion thereof between the rows exposed, a black board carried by the frame in front of the portion of the chart between the rollers and adjustable in a direction at a right angle to the rollers to expose any number of rows, means for operating the rollers and means for holding the black board in its adjusted position.

3. An educational device comprising a frame, spaced apart rollers mounted in the frame, a chart winding on the rollers with the portion thereof between the rows exposed, means for operating the rollers, a black board carried by the frame in front of the portion of the chart between the rollers and adjustable in a direction at a right angle to the rollers, a guide extending across the frame parallel to the rollers and a spacer adjustable along the guide, the spacer extending in the rear of the black board, and means for holding the black board in its adjusted position.

In testimony whereof, I have hereunto signed my name at Syracuse, in the county of Onondaga, and in the State of New York, this 24th day of April, 1925.

HERBERT H. WALTERS.